United States Patent [19]

Carlson

[11] 4,410,142

[45] Oct. 18, 1983

[54] METHOD AND APPARATUS FOR COMPOSTING WASTE

[75] Inventor: Carl-Göran H. Carlson, Tomelilla, Sweden

[73] Assignee: PLM AB, Malmö, Sweden

[21] Appl. No.: 249,992

[22] Filed: Mar. 30, 1981

[30] Foreign Application Priority Data

Feb. 19, 1981 [SE] Sweden ............................. 8101106

[51] Int. Cl.³ .............................................. B02C 19/12
[52] U.S. Cl. ....................................... 241/18; 241/30; 241/101.7
[58] Field of Search ......................... 422/273; 366/345; 241/27, 101.7, 30, 186 A, 186.1, 186.4, 18, 189 R

[56] References Cited

U.S. PATENT DOCUMENTS

| | | | |
|---|---|---|---|
| 909,576 | 1/1909 | Frost | 241/101.7 |
| 1,432,812 | 10/1922 | Wadsworth | 366/345 |
| 4,019,723 | 4/1977 | Urbanczyk | 422/273 X |
| 4,330,091 | 5/1982 | Rozeboom | 241/101.7 X |

Primary Examiner—Mark Rosenbaum
Attorney, Agent, or Firm—Beveridge, DeGrandi and Kline

[57] ABSTRACT

The disclosure relates to a method and an apparatus for composting waste. The waste is deposited in a compost layer of a height of up to 9 m and the base surface dimensions of at least 5 m×5 m, preferably at least 10 m×30 m. The waste is fed from the compost layer to a rapidly rotating cutting roller which comminutes the waste and, under intermixing and vortex motion, flings it through a conditioning compartment for degasification and aeration, whereafter the waste is discharged and deposited in a new compost layer. The apparatus according to the invention substantially comprises a chassis with a motor, wheels and steering, on which there are mounted a feeding assembly, two feeding screws, a cutting roller between the feeding screws, a conditioning compartment whose bottom preferably consists of a conveyor belt, as well as a discharge assembly which preferably consists of a conveyor belt which is pivotal laterally and vertically.

3 Claims, 3 Drawing Figures

METHOD AND APPARATUS FOR COMPOSTING WASTE

The present invention relates to a method and an apparatus for composting waste.

Waste, which is taken to mean residual products which have been assessed as being of no useful value and discarded, may be treated in a number of different ways, substantially dry, combustible waste which is biologically degradable to a slight or moderate degree being suitable for use a fuel, whereas wet or moist biologically degradable waste is treated in one of the following manners: spreading on fields; use in land filling; thermostabilization (pasteurization); combustion with fuel additives; anaerobic biological degradation (fermentation); aerobic biological degradation (composting); various other methods such as encapsulation in cement, use together with binders as material for the preparation of building tiles, use as fish feed in fish farming, etc.

On condition that transport and spreading costs are reasonable and that the applicable environment requirements have been satisfied, spreading on fields and use in land filling are often the cheapest and most suitable treatment methods. However, in view of today's energy costs and trends within technical development, composting is otherwise to be preferred both from the economical and from the technological points of view.

In years gone by, a number of different techniques have been developed for composting waste, the most important of these techniques being discussed briefly below.

The waste is deposited in a so-called long-term landfill area and is thereafter not subjected to any particular treatment. This technique is extremely doubtful and its function is uneven. Among other things, leachate problems occur.

Another technique is to deposit the waste in a landfill area having an aerated slab. In this technique, the material is placed, as a rule after premixing of the various components of the material, up in layers of a determined height, length and width on a concrete slab, whereafter air is sucked or blown through the waste according to a predetermined plan. Apart from the fact that the storage site proper requires high installation and maintenance costs, this method has a number of disadvantages. For example, the process progresses unevenly because of channel formation in the material, the process is slow and difficult to control, the quality of the product is low and uneven, and finally the process gives rise to unpleasant smell.

These two methods are so-called static methods, that is to say after deposition, no further handling takes place of the waste during the composting time. Apart from such static composting methods, there are also dynamic methods in which the waste is worked during the composting.

One such dynamic method is so-called reactor composting or closed composting in which the waste which is to be treated passes through a reactor such as a drum, a column or the like and in this reactor is turned, degasified for the removal of carbon dioxide, aerated for the supply of oxygen, and is required for moisture and temperature. A serious disadvantage inherent in reactor composting is that the reactor cannot, for reasons of economy, be made too large, with the result that the duration of stay in the reactor will be short and degradation of the waste incomplete. Consequently, a controlled maturing stage is necessary.

Another dynamic method, so-called windrow composting, employs a self-propelled machine which simultaneously moves through the waste and treats it. Here, the waste is laid openly in rows on a suitable substrate, such as a concrete slab, possibly under cover if the weather conditions so require. Each row is of a relatively slight width of roughly 2–4 m and a maximum height which is dependent upon the angle of repose related to the width of the row, and which is normally from 1.2 to 1.7 m. The width of the row is in general adapted to the machine employed, so that the machine may straddle the row and treat it during a single passage. Windrow composting is associated with a number of disadvantages, such as the fact that a large substrate surface is required for laying out the waste, that is to say the material loading per surface unit is low. In its turn, this entails a high level of effect on the waste in variations in the weather (such as precipitation) which results in an uneven product quality.

The object of the present invention is to obviate several of the disadvantages inherent in prior art composting methods and to realize a composting method which is economically viable and results in a stable product.

Like the windrow composting method, the present invention relates to dynamic composting with a self-propelled machine, but as opposed to the windrow composting method, the waste is, in the present invention, deposited in a large compost layer of a width of at least 5 m, preferably at least 10 m, a length of at least 5 m, preferably at least 30 m, and a height of up to 9 m. Deposition of the waste in such a compost layer entails that the material loading per surface unit will be favorably high according to the invention, that is to say the installation will be compact and economical. Furthermore, the waste is not appreciably influenced by changes in the weather even if no roof cover is provided over the waste.

According to the invention, the compost layer is treated by means of a new type of self-propelled machine which successively and in repeated periods works through the compost layer and feeds the waste, by means of a feeding assembly and two feeding screws, into a conditioning assembly where the waste is conditioned, under the action of a cutting roller, with respect to particle size, particle distribution, carbon dioxide content, oxygen content, moisture content and temperature, in order thereafter to be discharged by means of a discharging assembly and deposited in a new compost layer.

The machine according to the invention is highly maneuverable, for which reason demands on the evenness of substrate can be reduced. Thus, it is not necessary, according to the present invention, to provide expensive, specially constructed concrete slabs, it being instead sufficient to provide a simple asphalted substrate. This is a further economical saving made possible by the present invention.

Hence, it is a major object of the present invention to realize a method of composting waste wherein the waste is deposited in a compost layer having a length of at least 5 m, a width of at least 5 m and a height of up to 9 m, and wherein the waste is successively fed from the compost layer to a rotary cutting roller which comminutes the waste and flings it, under intermixing and vortex motion, through a conditioning compartment in which the waste is freed of carbon dioxide and is supplied with oxygen, whereafter the conditioned waste is deposited in a new compost layer; and wherein the above treatment is repeated periodically from once every tenth minute to once every sixtieth day for a total of from 1 to 120 days.

It is a further major object of the present invention to provide an apparatus for composting waste, the apparatus comprising a chassis with wheels and a motor, and the apparatus further comprising:

(A) a movable feeding assembly mounted on the forward end of the apparatus, for feeding waste from the compost layer to two rotary feed screws located beneath the feeding assembly;

(B) a conditioning assembly having a rotary cutting roller provided with cutters and disposed between the feeding screws and a conditioning compartment located, seen in the feeding direction of the waste, after the cutting roller; and (C) a discharge assembly for receiving the waste from the conditioning compartment and discharging and depositing the waste in a new compost layer.

Compared with the prior art, the present invention involves a number of advantages.

As was intimated earlier, one important advantage is that the surface area required for the process is small, that is to say the material loading per surface unit is high in the present invention. As a result, installation costs may be kept at a minimum. The high material loading is realized not least as a result of the manner of driving the machine through the compost layer, as well as of depositing a new compost layer. In the treatment process, the machine is driven through the compost layer along a row whose width corresponds to the width of the machine. After the treatment is completed, the compost is deposited in a new row of substantially the same width for building up a new compost layer. The new row is deposited close to the machine and normally obliquely behind or at the side of the machine, that is to say on that side of the machine which is located opposite the original compost layer. In the treatment process, the machine moves reciprocally through the compost layer, thereby simultaneously building up the new compost layer with new rows which are disposed approximately at one machine width's distance from the original compost layer. When the entire compost layer has been treated once, a new compost layer has thus been built up at approximately one machine width's distance from the original compost layer. In the subsequent treatment, the compost layer is moved back approximately one machine width in the lateral direction and will thereby be placed on the site of the original compost layer. In a manner of speaking, the compost layer, in the repeated treatments, oscillates laterally, substantially at right angles to the direction of advancement of the machine. It will be appreciated that the total surface which is required according to the invention for storing and working a compost layer substantially comprises but the surface area for the compost layer proper, together with the surface area of one row of a width corresponding to one machine width.

A further advantage in the present invention is that the exposed surface per unit of volume of waste is small, which entails that the state of the weather will have but slight influence.

Compared with other composting methods, such as with positive aeration or with a reactor, the method according to the present invention requires low investment and running costs.

These and other advantages inherent in the present invention will be further apparent to the skilled reader of the following description of the method and apparatus according to the present invention.

In the method according to the present invention, biologically degradable material from various sources, such as domestic waste, sewage sludge, waste from the foodstuffs industry, for example scraps from the vegetable industry and slaughterhouse offal, etc. is treated in the substantially solid phase in an aerobic, mesophilic or preferably thermophilic process.

As was indicated above, the waste is deposited in a compost layer of considerable dimensions, the height of the layer being up to 9 m and, in practice, suitably at least 1 m, preferably from about 2 to about 4 m. Prior to the deposition in the compost layer, the waste is suitably intermixed and homogenized. Further intermixing and homogenization take place in conjunction with the treatment according to the present invention.

The treatment according to the present invention provides even and homogeneous conditions in the treated material with a good degree of control of particle size and distribution, while at the same time eliminating unfavourable channel formation which is an important contributory factor to the formation of cold and hot zones, wet and dry zones, and aerobic and anaerobic zones.

Apart from the parameters of particle size and particle distribution, the present invention calls for the control and optimation of the carbon dioxide content (degasification), the oxygen content (aeration), the moisture content, the temperature, the treatment frequency and the total processing in time.

By optimum regulation of the process parameters according to the present invention, there will obtained a rapid and complete degradation of the biologically degradable material in the waste, which may be demonstrated by a measurement of the biochemical oxygen demand (BOD). The biochemical oxygen demand is, here, measured during two (BOD2), five (BOD5) and seventeen (BOD17) days, respectively, BOD17 being the most stringent criterium for stabilization of the biologically degradable material. In the invention, BOD17 is reduced by more than 80%. Moreover, the presence of pathogenes or parasites cannot be demonstrated in the finished compost. This entails that the waste will attain, in the present invention, a very high degree of stability and hygiene.

In this context, it might be mentioned that, in the field, it is often impractical to measure BOD17, since this takes too long a time. Instead, a correlation to units which may be determined rapidly, such as ash content, carbon dioxide content or pH may be drawn. In order, after deposition of the waste in a compost layer according to the above, to treat waste under optimum control of the above-mentioned parameters, the waste is successively fed from the compost layer to a conditioning assembly, where the waste, after intensive working and comminution with a rotary cutting roller, is flung through a conditioning compartment under intermixing and vortex motion, in order thereafter to be discharged from the conditioning compartment and deposited in a new compost layer.

The conditioning compartment is in the form of an elongate zone in which at least the forward and rear ends are open for receiving and discharging waste, whereas the rest of the conditioning compartment may be provided with defining walls. Even if such defining walls are not necessary, they are suitable for realizing guiding of the waste during its conveyance through the conditioning compartment. At the very least, it is preferable that the undermost section of the conditioning compartment be provided with a defining floor which is preferably designed in the form of a conveyor belt which is movable from the forward to the rear end of the conditioning compartment.

Because of the kinetic energy which is imparted to the waste material by the cutting roller, the waste material is flung out through the conditioning compartment. Since the waste material is here brought into motion in slightly different directions by the cutting roller, the material will be flung through the conditioning compartment under powerful intermixing and vortex motion, that is to say even if the major direction of movement of the material is from the forward towards the rear end of the conditioning compartment, the discrete material particles also move vertically and horizontally, at right angles to the major direction of movement. This intermixing and vortex motion in the material entail an extremely effective degasification and aeration of the waste, that is to say carbon dioxide which has been formed is removed from the waste and oxygen is added to the waste. This degasification and aeration may be further amplified by providing the conditioning compartment with a fan.

As a result of the comminution of the waste by the cutting roller and the subsequent aeration of the waste, a certain regulation of the moisture content of the waste will be obtained, normally a reduction. If it is desired to further reduce the moisture content of the waste, the conditioning compartment may be provided with a drier, but in view of the great amounts of waste which are treated, this is often less viable from the economic point of view. A simple and effective method of further reducing the moisture content of the waste is to increase the intensity in the process treatment by increasing the treatment frequency or the speed of the cutting roller with respect to the rate of movement of the machine. If, on the other hand, it is desired to increase the moisture content of the waste, the conditioning compartment may be provided with a sprinkler or humidifier device, for example, in the form of a water nozzle.

Once the waste material has passed through the conditioning compartment, it arrives at a discharge assembly which conveys the treated waste further and deposits it in a new compost layer of the same dimensions as the original layer.

Despite the effective treatment afforded according to the present invention, it is often not sufficient to provide but a single treatment in order that the waste be completely composted. Consequently, the above-described treatment must normally be repeated one or more times for a shorter or longer period. The treatment frequency and total treatment time are dependent upon the composition of the waste, as well as the ambient conditions, that is to say climate and prevailing weather conditions, and may vary within very broad limits. Thus, the treatment frequency may vary from once every tenth minute to once every sixtieth day, whereas the total treatment time may vary from about 1 to 120 days.

In order to carry the method according to the invention into effect, use is made, as was mentioned above, of a new type self-propelled machine. This will now be described in greater detail with reference to the accompanying drawings which illustrate one embodiment of the apparatus according to the present invention, and on which:

Figure 1:
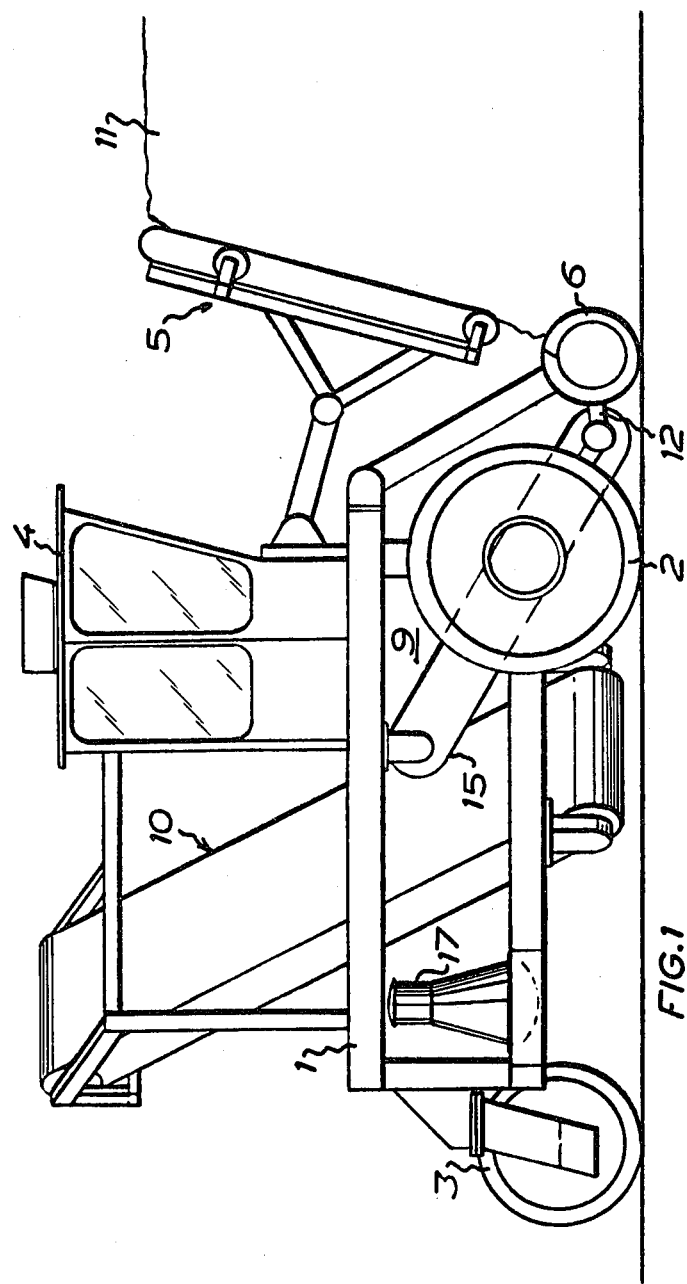
FIG. 1 is a side elevation of a machine according to the invention.

As is apparent from FIG. 1, the machine according to the invention comprises a frame or chassis 1, wheels 2, 3, a cabin 4, various auxiliary assemblies 5, 6, 7, 8, 9, 10 and a motor 17 for driving the machine and its auxiliary assemblies.

The chassis, the wheels, the cabin, the motor and its drive are of conventional type and need no further description here. However, it might be mentioned that the forward driving means is suitably disposed on the forward wheels 2, whereas the the rear wheels 3 are the steering wheels and are disposed as closely together as possible in order to render the machine stable, compact and easily maneuvered.

A movable feeding assembly 5 is mounted on the forward portion of the machine. This assembly is intended to loosen and tear down waste from the high compost layer 11, so that the waste may be treated by the machine. According to the presently preferred embodiment illustrated in FIGS. 1 to 3, the feeding assembly consists of a conveyor belt which is mounted on the forward portion of the machine so that it is movable upwardly, downwardly, forwardly and to the sides. The rollers of the conveyor belt are, in a per se known manner, hydraulically driven by means of the motor of the machine. The conveyor belt is disposed about the rollers in order to be driven by them, and is, on its outside, provided with pins or dogs (not shown) for loosening and tearing down the waste.

Figure 2:
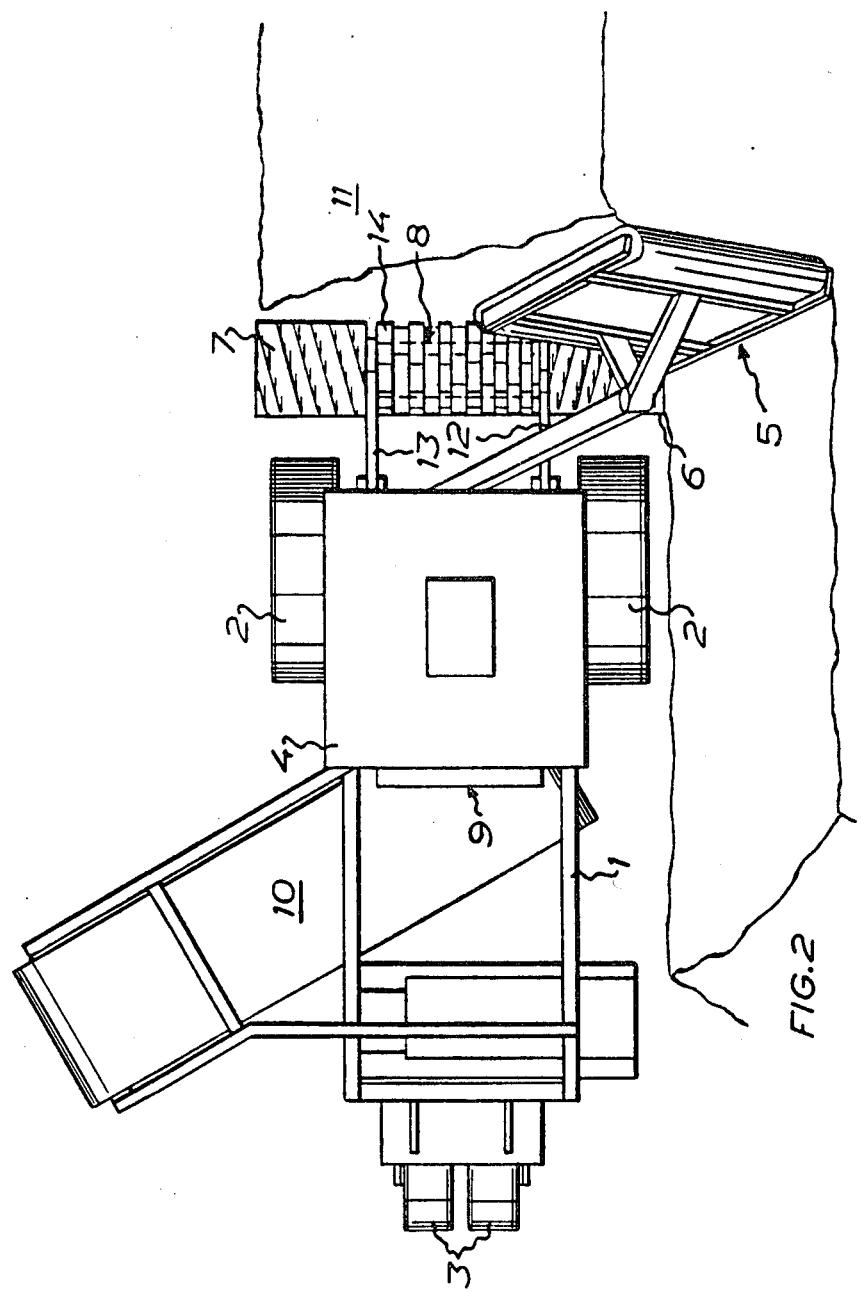
FIG. 2 is a top plan view of the machine according to FIG. 1.
Figure 3:
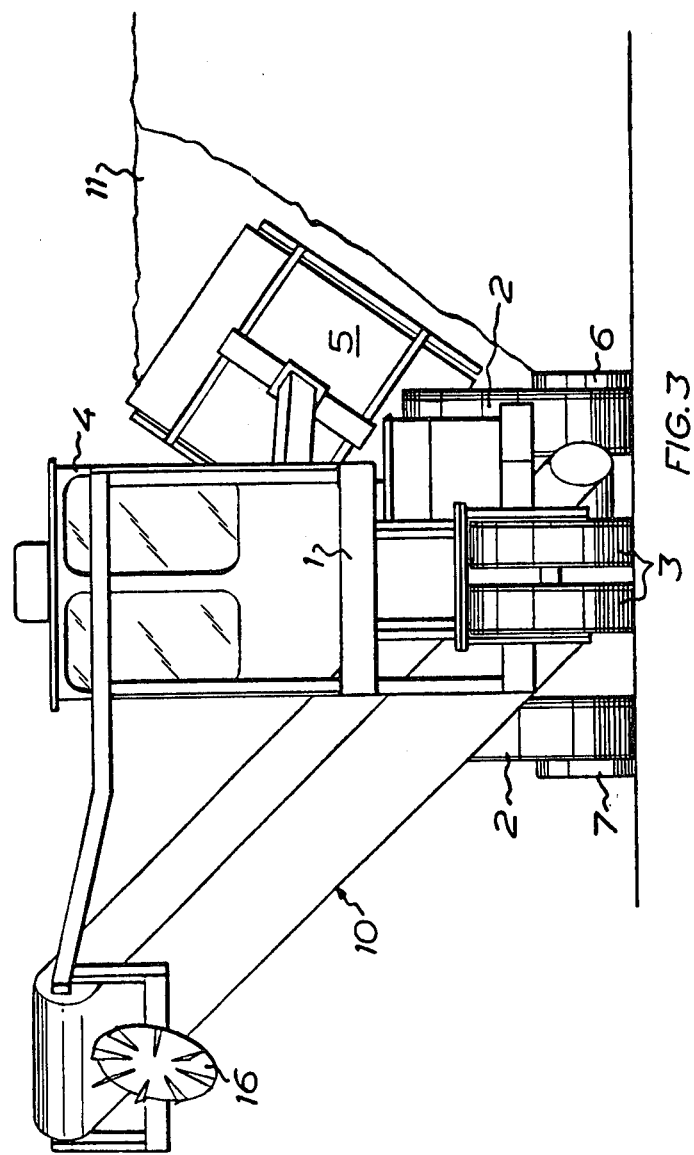
FIG. 3 is a rear view of the machine according to FIG. 1.

As is most clearly apparent from FIG. 2, two feeding screws 6 and 7 are also mounted on the forward portion of the machine. These feeding screws are coaxial, that is to say they have the same major axis, whereas the screws may be provided with the same or different drive shafts. In the latter case, the screws 6 and 7 may be driven at different speeds. Driving of the feeding screws is effected by means of the previously mentioned motor in a per se known manner, either hydraulically or, preferably, by means of chains as intimated at 12 in FIGS. 1 and 2. The speed of the feeding screws may, depending upon the amount of waste and the forward driving rate of the machine, be varied within the range of from 1 to 500, preferably about 1 to 200 rpm. The diameter of the screws is about 0.3 to 3.0, preferably about 0.5 to 1.5 m, including a thread height of about 0.1 to 2.0, preferably about 0.15 to 0.5 m. For feeding-in the waste towards a cutting roller 8 disposed between the feeding screws, the threads of the feeding screws have a pitch of about 4° to 60°, preferably about 15° to 45°. In order further to improve the entraining of the waste by means of the screw threads, the threads are preferably provided with teeth which are disposed at an angle of from 0° to 180° with respect to the threads. The feeding screws are each of a length of about 0.3 to 3.0, preferably about 0.5 to 1.5 m.

A cutting roller 8 is disposed between the feeding screws 6 and 7 and coaxially therewith, the cutting roller being driven independently of the feeding screws, for example, by means of a chain 13. The length of the cutting roller 8 is about 0.3 to 3.0 preferably about 0.5 to 2.0 m and its diameter is about 0.3 to 3.0, preferably at 0.5 to 1.5 m. A multiplicity of knife means 14 is disposed about the surface of the cutting roller, the knife means having a height of about 0.1 to 0.6 m. These knife means may be of greatly varying designs, such as T-shaped flails, straight, edged knives, curved knives, oblique knives etc. but they all have the feature in common that they are pivotally jointed in the cutting roller 8. The pivot shaft of the joints is substantially at right angles to the direction of rotation of the cutting roller so that the knives, on rotation of the cutting roller, are caused by centrifugal force to assume a radially outwardly directed position for the most effective working of the waste. Like the feeding screws, the knives 14 of the cutting roller are preferably disposed in helical rows (not shown) in such a manner that the waste, on being worked by the cutting roller, is moved in a feeding direction from the outer edges of the cutting roller towards its centre. The cutting roller 8 rotates at a higher speed than that of the feed screws 6 and 7. This speed may be varied within the range of from 1 to 1000 rpm.

On operation of the machine, the waste material is fed in by means of the screws 6 and 7 to the rapidly rotating cutting roller 8 which works the waste intensively with its knife means and comminutes the waste. By suitably regulating the speed of the cutting roller and the rate of advancement of the machine, it is possible to obtain the desired particle size and particle distribution in the waste. In such an instance, an increase in the speed of rotation and reduction in the rate of advancement of the machine result in more intensive working of the waste with consequential smaller particle size and closer particle distribution. Apart from comminuting the waste, the cutting roller flings it rearwardly under intensive intermixing and vortex motion through the conditioning compartment 9. This intermixing and vortex motion are realized in that the waste particles, during their rearward movement through the conditioning compartment, collide with each other, this being assisted to a great extent by the fact that the waste, apart from the rearwardly directed movement, is also caused to move sideways by the feeding screws and preferably also by the cutting roller. This means that an average waste particle moves from the cutting roller 8 and obliquely rearwardly through the conditioning compartment 9, the particle, during its movement, colliding with other particles such that it executes, apart from its rearward movement, also sideways and vertical movements. This intensive vortex motion and intermixing entail that extremely good contact is achieved with the ambient atmosphere so that the waste rapidly and effectively is degasified, that is to say freed from carbon dioxide, and is aerated, that is to say supplied with oxygen. The importance of rapid and effective degasification and aeration cannot be overemphasized.

Simultaneously with degasification and aeration, the waste is brought into contact with the ambient atmosphere in the conditioning compartment 9 which entails a temperature reduction from the temperature of about 60° C. which the waste normally holds in the compost layer 11. If the waste is not treated according to the invention, but is allowed to remain in the compost layer, anaerobic processes will gradually commence, the temperature in these zones rising to about 80°–95° C., at the same time as other zones remain cold and without being influenced by these processes. If, on the other hand, the waste is regularly treated in accordance with the invention, the temperature of the waste will fall and there will not be enough time to develop the optimum temperature level of about 60° C. in the compost layer between treatments. Consequently, an accurate balancing of the treatment frequency is an important means for a regulated temperature and optimum process.

In the treatment of the often moist waste by comminution, gasification and aeration, a reduction of the moisture content of the waste is also often achieved, which, as was mentioned earlier, may be further reduced by intensifying the process working. Moreover, the moisture content can be influenced by some form of drier (not shown) which is disposed in the conditioning compartment. This drier may consist of an air fan which involves the further advantage that the degasification and aeration of the waste are intensified and improved. Instead of an air fan, it is conceivable to provide a heating element which gives off heat to the waste, but in view of the great amounts of energy which this would require, this alternative is unsuitable from the economic point of view.

If, on the other hand, the waste is too dry, that is to say its moisture content too low, the moisture content can simply be increased by the provision, in the conditioning compartment, of a moisturizer (not shown), such as a water container with a discharge conduit and a nozzle for sprinkling the waste with finely divided water.

On the drawings, the conditioning compartment 9 has been shown as a open compartment which comprises the portion above and along the conveyor belt 15, the belt, thus, forming the bottom or floor of the conditioning compartment. In most cases, such a design of the conditioning compartment is fully sufficient, but in certain cases it may be desirable and suitable to provide the conditioning compartment with defining side walls and top in order to create a more enclosed compartment. Irrespective of whether the conditioning compartment is provided with open, perforated or enclosed defining surfaces, it is, however, important that the conditioning compartment be provided with a forward opening for feeding in of the waste flung from the cutting roller, and a rear opening for discharge of the waste. It is to be preferred that the lower portion of the conditioning compartment be defined by a conveyor belt 15 which catches falling waste material and conveys it towards the discharge opening of the conditioning compartment, but this is not necessary, the bottom section can instead be designed in a different manner, for example as smooth metal sheeting.

The dimensions of the conditioning compartment may be varied within broad limits, but preferably the length of the compartment lies within the range of from 1 to 5 m and its cross-sectional area in the range of about 1 to 8 m$^2$.

A discharge assembly 10 is provided after the conditioning compartment 9 for discharging the treated waste and for depositing the waste in a new compost layer. As shown on the drawings, the discharge assembly 10 preferably consists of a conveyor belt, but may also consist of a bucket elevator or similar means for removal of the waste from the discharge end of the conditioning compartment. In order that it be possible to deposit the waste evenly in a compost layer of a height of up to 9 m the discharge assembly is preferably raisable and lowerable in the vertical direction. Moreover, the discharge assembly is preferably rotatable in the horizontal direction through from 0° to 150° on one or both sides of the longitudinal axis of the machine so that the waste can be discharged as desired from a position straight behind the machine to a position obliquely ahead of the machine. Furthermore, the discharge assembly 10 can be provided with a rotary spreader disc 16 in order that the discharged waste be spread as evenly as possible in the new compost layer, thereby preventing the formation of ridges.

On the accompanying drawings, the machine has, for purposes of simplicity, been shown with a fixed discharge assembly 10, but the skilled reader will appreciate that the assembly may readily be made raisable and lowerable as well as pivotal. One of several manners of realizing this is to mount the discharge assembly rotatable about a vertical axis near the cabin 4. For free rotatability, the conveyor belt is, in its entirety, disposed above the chassis 1, such that it does not engage with the chassis on pivoting. The conveyor belt 15 is simultaneously extended so that it terminates above the discharge assembly 10, that is to say such that the waste from the conveyor belt 15 is tranferred to the discharge assembly 10.

The following non-restrictive Examples of the present invention are here presented in order further to illuminate the various aspects of the invention.

EXAMPLE 1

According to this Example, treatment was effected of waste which consisted of two parts of screen fraction which had been obtained as heavy fraction in the separation of domestic waste from which magnetic material has been separated, and one part of partly digested and dewatered biological sludge and chemical sludge from a municipal sewage treatment plant having a total solids (T.S.) of 23 weight %.

The waste was deposited in a compost layer of a height of 3 m, the bottom surface of the layer having the dimensions 50 m×50 m.

The compost layer was treated by the method according to the present invention with the assistance of the above-described machine. The machine was driven by a motor which developed 200 h.p., the diameter of the feeding screws was 1.0 m, their length was 1.5 m each, whereas the cutting roller had a diameter of 1.0 m a length of 1.75 m and rotated at a speed of 200 rpm.

The waste was treated with the machine once every third day during a total treatment time of four weeks. The obtained, finished compost was odorless, displayed a BS17 reduction of just above 88% and lacked pathogenes, parasites and parasite eggs.

EXAMPLE 2

According to this Example, treatment was effected of waste which consisted of one part sludge of the same type as in Example 1, one part scraps from the vegetable industry having a total solids of 30 weight %, one part bark, and two parts recirculated compost.

The waste was deposited in a compost layer of a height of 2.5 m and a bottom surface having the dimensions 30 m×60 m.

The waste was treated with the same machine as in Example 1, the speed of the cutting roller being, however, 275 rpm. The treatment was carried out once every other day for a total treatment time of 24 days, when a stable finished product was obtained. The mature compost was odorless, displayed a BS17 reduction or just above 85% and lacked pathogenes or parasites and parasite eggs.

EXAMPLE 3

According to this Example, treatment was effected on waste which consisted of one part sludge of the same type as in Example 1, and two parts of horse manure from riding stables.

The waste was deposited in a compost layer of a height of 3.2 m and a bottom surface of the dimensions 40 m×60 m.

The waste was treated with the same machine as in Example 1, but the speed of the cutting roller was 350 rpm. The treatment was carried out once every fifth day for a total treatment time of 30 days, when a stable finished product was obtained. The mature compost product was odorless and displayed a BS17 reduction of just above 87%. Pathogenes, parasites and parasite eggs could not be found.

What I claim and desire to secure by Letters Patent is:

1. A method of composting waste which comprises depositing the waste on the site of an original compost layer having a length of at least 30 m, a width of at least 10 m and a height of up to 9 m, successively feeding waste from the compost layer to a rotary cutting roller which has a direction of movement relative to the compost layer and which comminutes the waste and flings it under intermixing and vortex motion through a conditioning compartment in which the waste is conditioned and freed of carbon dioxide and is supplied with oxygen, thereafter depositing the conditioned waste in a new compost layer laterally of the original compost layer and, during a subsequent conditioning, returning the conditioned waste to the site of the original compost layer, whereby the waste, during repeated conditionings, is subjected to an oscillating movement substantially perpendicular to the direction of movement of the cutting roller, and repeating the above cycle periodically from once every tenth minute to once every sixtieth day for a total of from 1 to 120 days.

2. The method as recited in claim 1, wherein the BOD17 of the waste is reduced by at least 80%.

3. The method as recited in claim 1, wherein the removal of carbon dioxide and supply of oxygen in the conditioning compartment are promoted by a fan.

* * * * *